Sept. 10, 1963

F. G. NICKL ETAL 3,103,073

INSTRUCTOR SYSTEM

Filed Oct. 4, 1960

INVENTORS
FRANKLYN G. NICKL
PAUL D. KILBURY Jr.
BY
Attorneys

Sept. 10, 1963 F. G. NICKL ETAL 3,103,073
INSTRUCTOR SYSTEM
Filed Oct. 4, 1960 6 Sheets-Sheet 2

INVENTORS
FRANKLYN G. NICKL
PAUL D. KILBURY JR.
BY
Luluider Mattingly & Huntley
Attorneys

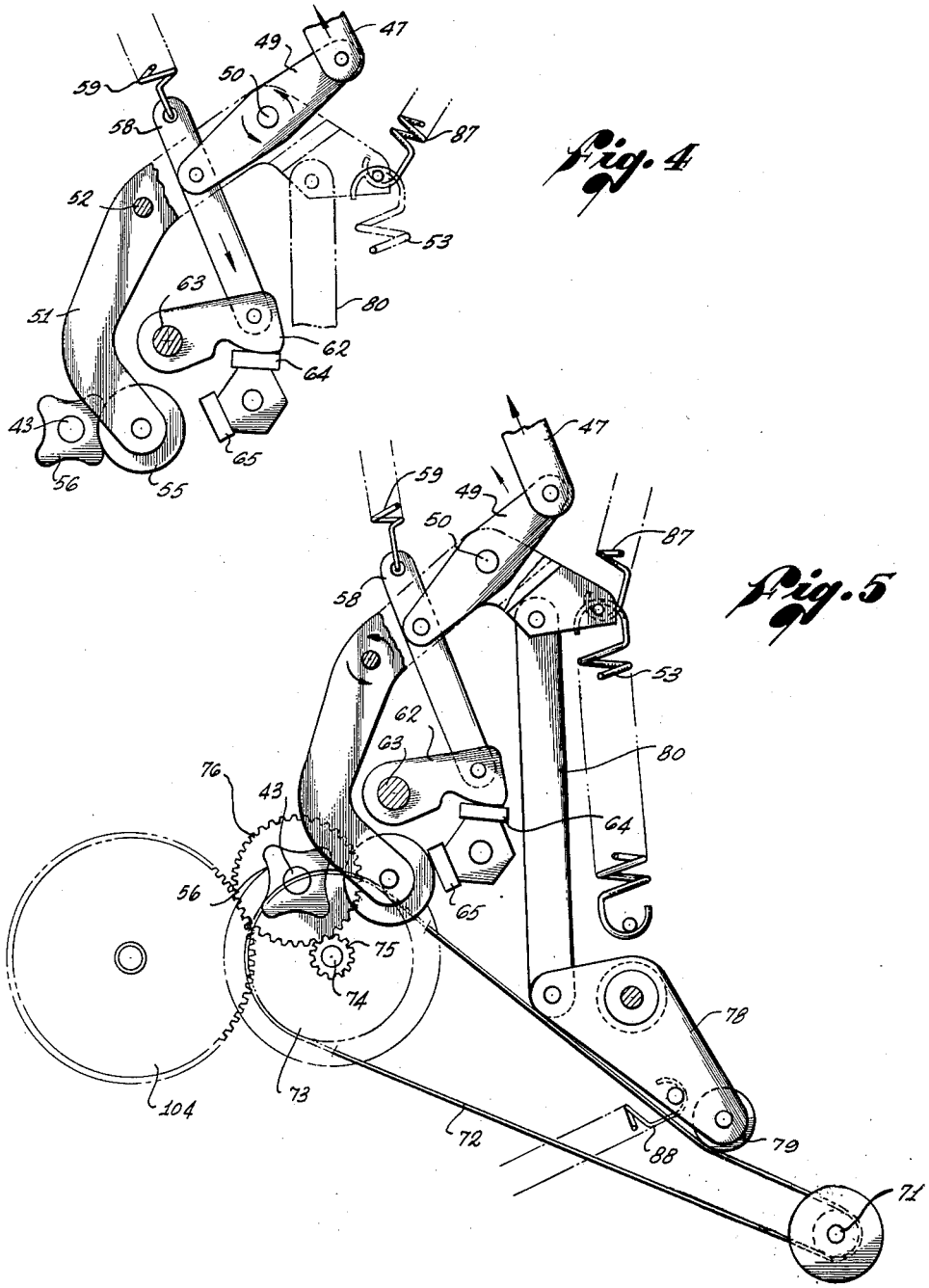

Sept. 10, 1963   F. G. NICKL ETAL   3,103,073
INSTRUCTOR SYSTEM
Filed Oct. 4, 1960   6 Sheets-Sheet 4
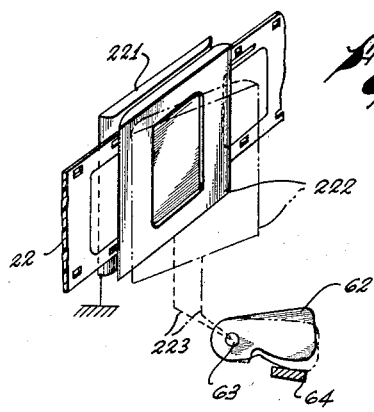
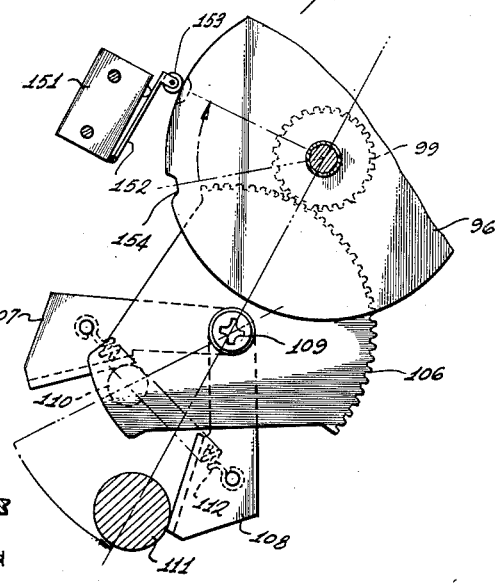
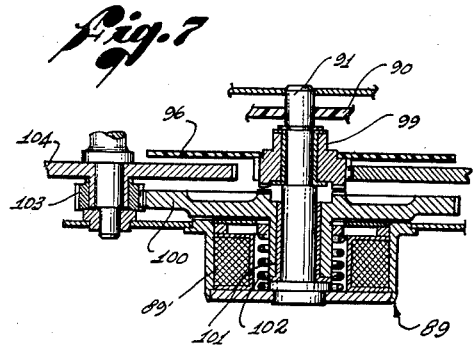
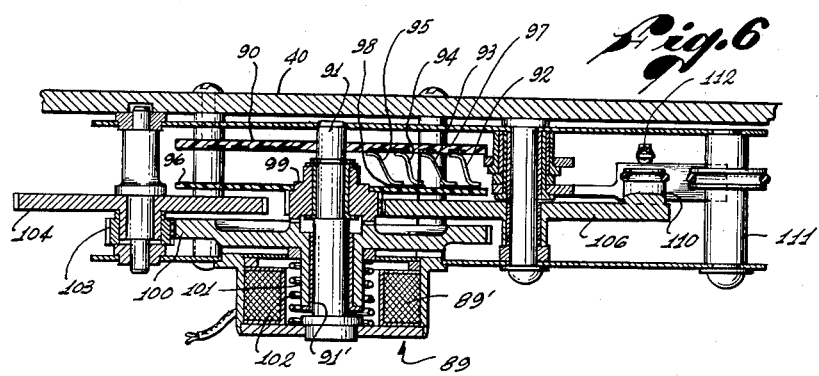
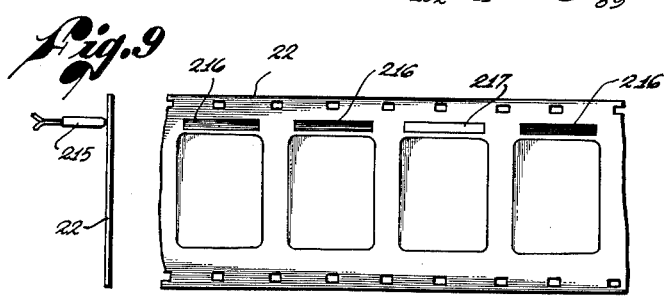
INVENTORS.
FRANKLYN G. NICKL
PAUL D. KILBURY Jr.
BY
Attorneys

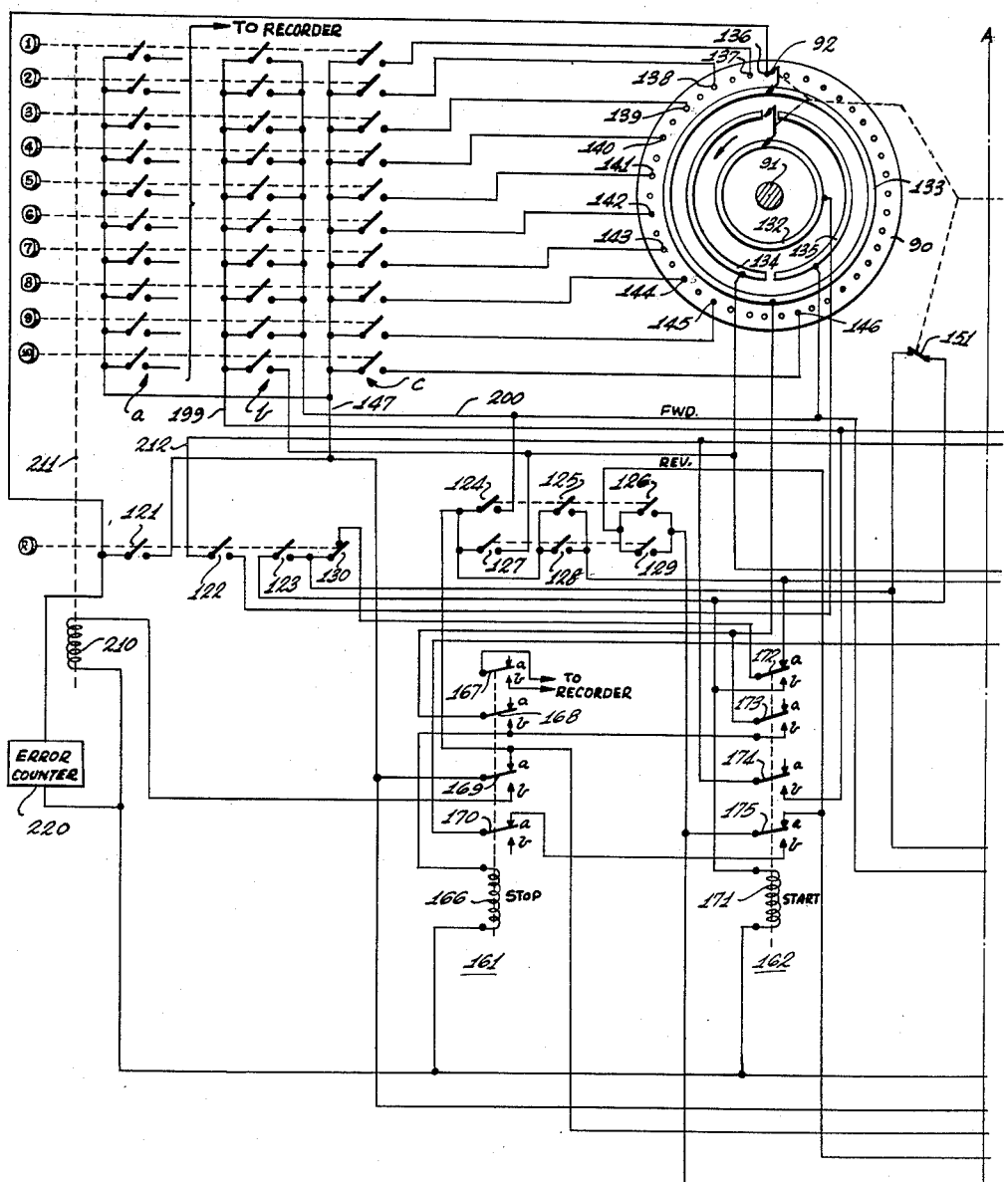

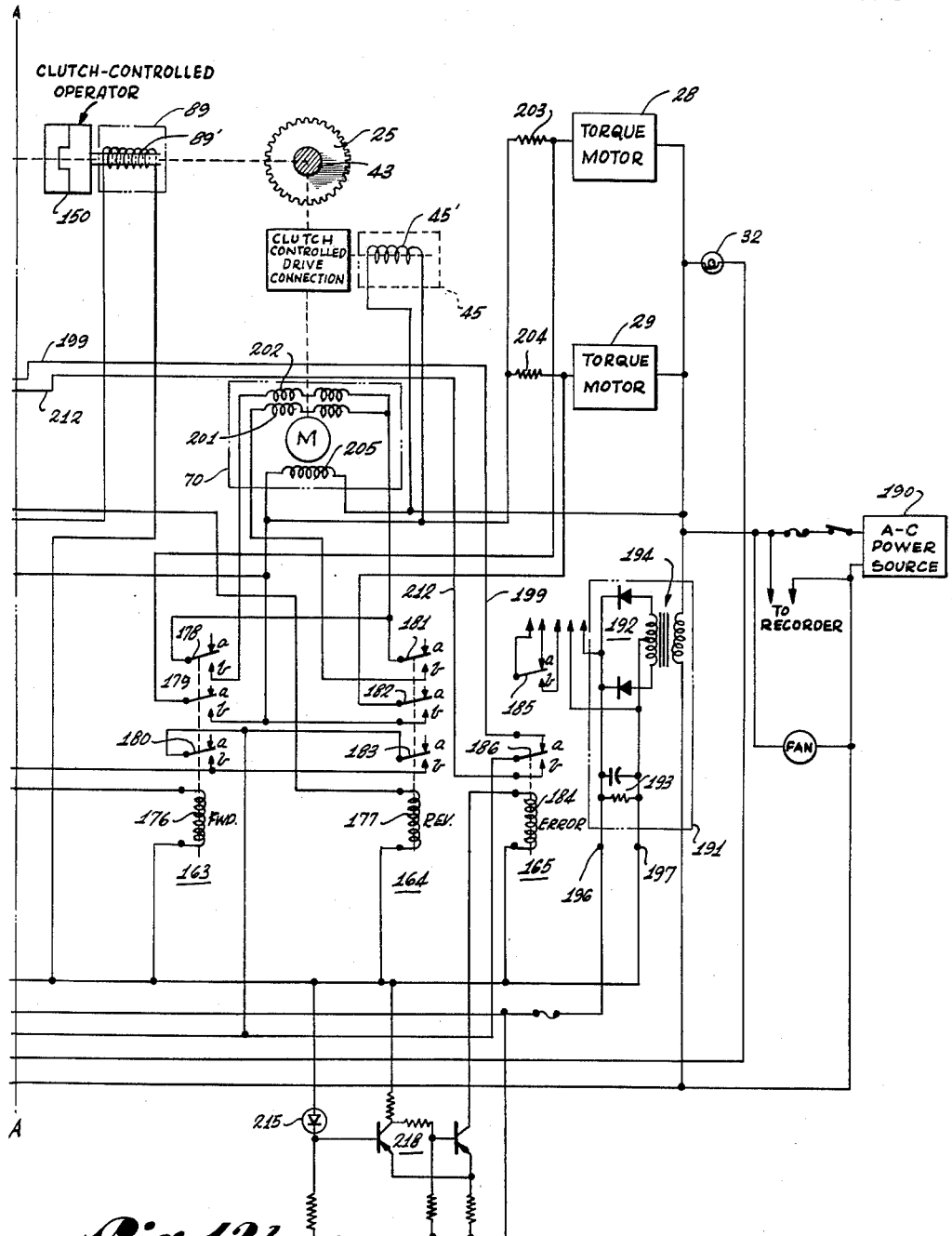

United States Patent Office 3,103,073
Patented Sept. 10, 1963

3,103,073
INSTRUCTOR SYSTEM
Franklyn G. Nickl and Paul D. Kilbury, Jr., Santa Barbara, Calif., assignors to U.S. Industries, Inc., New York, N.Y., a corporation of Delaware
Filed Oct. 4, 1960, Ser. No. 60,338
19 Claims. (Cl. 35—9)

This invention relates to teaching aids, and more particularly to a unique method and apparatus for self-tutoring purposes.

More specifically, this invention relates to the type of self-tutoring apparatus that utilizes intrinsic programming rather than extrinsic programming.

The primary distinction between the types of self-tutoring devices referred to is that, in intrinsically programmed devices, the student directs machine operation, whereas he does not control such operation of devices that are extrinsically programmed.

An example of an extrinsically programmed system is that shown and described in the article, "Electronic Teaching Devices," Paul K. Weimer, RCA Technical Notes, RCA TN No. 51 (Radio Corporation of America, 1957). This type of device is one in which a lesson plan is printed on a sheet as parallel columns of lesson units and questions with multiple choice answers. A lesson unit contains a quantum of information on which the adjacent question is based.

The sheet is located on a panel on which, adjacent each answer, is an area to be selectively illuminated upon actuating a respective switch. On actuating a switch, the illuminated section reveals whether the student's answer was right or wrong, and may coach him if his answer was incorrect. The number of switches and illuminating lamps, and the circuit wiring therefor, are made up to match the arrangement of material of the lesson units. The greater the number of lesson units, the more complex the machine. Or, if the number of lesson units to be given exceeds the capacity of a machine, another machine, in effect, must be provided. This necessarily means that machinery of this type for teaching purposes is exceedingly complex and costly.

It will be apparent that in the above type of teaching machine the program is inflexibly "built in." Its most objectionable drawback is that it is the machine—not the student—that determines the student's path of progression through the material.

An example of an intrinsically programmed self-tutoring system is the type that employs a length of film on reels, wherein a lesson unit, with an accompanying question and multiple-choice answers, is presented on each frame. The frames are consecutively numbered, but the frames bearing lesson units that are in logical sequence are randomly located along the film. Each answer is accompanied by an instruction as to which succeeding frame should be "called up" by the student if he selects that answer. A reversible motor for the reels is operated in response to the student's command, through a push-button and relay control system, to drive the film directly to the frame designated by the student.

If the student's answer is correct, the new frame that is presented to him in response to this command provides additional information to further his progress. If the answer chosen was incorrect, the new frame presented to the student will so advise, and may provide him with further instructions and directions which he must follow before he can take the step permitting him to proceed in accordance with the correct answer. For example, a student making and and choosing a wrong answer may, upon the commanded frame being presented to him, be directed to return directly to the preceding frame and choose another answer. Or, he may be directed to proceed to a succession of different frames that give him additional coaching before directing him to return to the frame at which he made the wrong answer. As will be apparent, the program is in the film, not in the machine.

Thus, the same machine can be used, without change, to present any desired lesson program. And of greatest importance is the fact that it is the student—not the machine—that determines his progress.

However, prior art devices of the above described type, that utilize intrinsic programming, are unduly large, complex and expensive for some purposes. The command buttons and switches for such devices, are arranged and operated in accordance with a digital control code to permit a device to handle a vast number and arrangement of lesson units, e.g., ten thousand frames on a strip of film. However, many types of lesson plans can be programmed on relatively few frames, e.g., considerably less than a thousand so that such a comprehensive device is not needed.

Further, it is often desired to provide small, self-tutoring devices of the film type in quantity for a large number of students. Clearly the type of machine above described can be made on a smaller scale and have less capacity. However, a prerequisite for quantity production is low cost, and the digital control system is undesirably costly, even for a compact self-tutoring device.

It is an object of our invention to provide an improved instruction system and apparatus that overcomes the above and other disadvantages of self-tutoring apparatus of the prior art.

It is another object of this invention to provide a self-tutoring device characterized by intrinsic programming of instruction material in a film projector in which successive units of a course of study are contained on non-successive film frames, and which includes selective control means of simpler design than heretofore known to permit projection of frames in logical sequence only in accordance with the individual student's ability to learn.

It is also an object of this invention to provide, for a self-tutoring device that employs a strip of film in which non-successive frames contain items of information in a logical sequence, a unique control system in which switching apparatus movable from a predetermined neutral position is always indexed to a correct answer position of the strip of film.

Yet another object of this invention is to provide an electrically operable self-tutoring device for leading an individual student through a course of study at a pace commensurate with his own individual ability, and which comprises a minimum number of component parts of simple design and rugged construction.

The above and other objects and advantages of this invention will become apparent from the following description taken in conjunction with the accompanying drawings of an illustrative embodiment thereof, in which:

FIGURE 4 is a fragmentary top plan view of certain portions of the mechanism shown in FIGURE 2, showing the parts in position preparatory to operation of the drive sprocket by the belt drive;

FIGURE 5 is a fragmentary top plan view, similar to FIGURE 4, showing the parts in the positions wherein the drive motor rotates the drive sprocket;

FIGURE 6 is a side elevation view in section of the indexing switch assembly for indexing the neutral position thereof to the correct answer position represented by the operative external switch control, and showing the wiper contact assembly operatively connected for operation by the drive sprocket;

FIGURE 7 is a fragmentary sectional view of certain portions of the control assembly of FIGURE 6, showing the operation of the solenoid to effect release of the wiper assembly for automatic return to the neutral position;

FIGURE 8 is a fragmentary top plan view of a portion of the control assembly of FIGURE 6, showing the spring return means for automatically returning the wiper assembly to neutral position upon its release in the manner shown in FIGURE 7;

FIGURE 9 is an end elevation view of a strip of film, showing a photo diode positioned adjacent the marginal edge of the film for detecting the character of the answer pursuant to which the frame currently being viewed was selected;

FIGURE 10 is a fragmentary top plan view of a strip of film showing how areas along the marginal edge and adjacent the frames are treated so that the photo diode of FIGURE 9 develops a current when the frame being displayed resulted from an incorrect answer;

FIGURE 11 is a fragmentary perspective view of the strip of film, showing protective transparent glass plates for clamping the film while it is being viewed, and showing one of the plates being movable to release the film prior to operation of the drive sprocket; and FIGURES 12a and 12b illustrate schematically a control circuit of our invention for synchronizing the various operations of the drive and clutch units.

Figure 1:
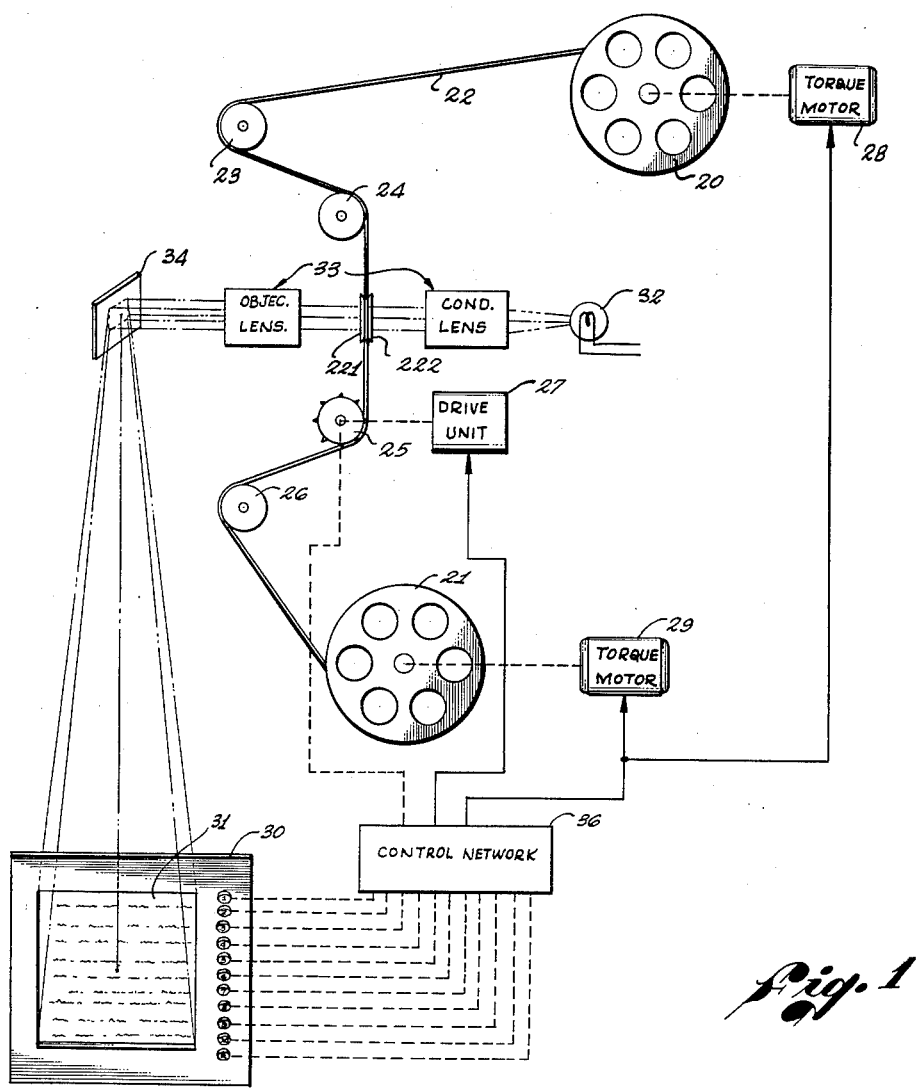
FIGURE 1 is a perspective view of the front panel of a device embodying the invention, showing a display screen upon which to project frames of a film, and showing an arrangement of manual switch controls on the panel for controlling the operation of the film drive unit to display material contained on the frames.

Referring to FIGURE 1, the self-tutoring system of this invention in one form employs a projector mechanism that includes a pair of reels 20, 21 for carrying a roll of film 22. The film 22 is adapted to be transported by a spool and sprocket arrangement 23—26, the sprocket 25 being the drive sprocket for the film. As indicated, a drive unit 27 is mechanically linked to the shaft of the drive sprocket 25 for driving it in the desired direction. In this connection, the drive unit 27 is adapted for driving the film 22 in either direction.

To take up slack in the film 22, respective torque motors 28, 29 are provided for the reels 20, 21. As indicated the torque motors 28, 29 tend to urge the reels 20, 21 in opposite directions. In this manner, aiding torque is exerted on the reel that is "ahead" of the drive sprocket.

The projector is located in a housing (not shown) that is provided with a front panel 30 in which a viewing screen 31 is supported. As indicated, the film 22 between the spool 24 and the sprocket 25 is located adjacent a suitable light source, which may be a conventional projector lamp 32. On opposite sides of the film 22 are condensing and objective lenses of a lens system 33 through which images on the film frames are projected and directed by a reflective element 34 onto the viewing screen 31.

The drive unit 27 is operated so as to start and stop the film 22 under the control of a bank of push-buttons "1"–"10" and "R" that are mounted on the front panel 30. The numbered buttons represent different numbers of film frames, relative to the film frame that is adjacent the light source 32 at any instant, through which the film 22 is commanded to advance. In this connection, the drive unit 27 is operated through a control network 36, as are torque motors 28, 29. As indicated, the control network 36 is conditioned for operation through the pushbuttons and associated mechanical linkages.

For self-tutoring purposes, each frame of the film 22 contains information that constitutes a finite portion of a course of study. However, different frames of information that follow in logical sequence are not consecutive, i.e., the information items of the course of study are "scrambled" in their positions along the film.

Normally, respective frame portions in a course of study contain a certain quantum of information, followed by a question based on that quantum and its relation to the portion of the course thus far covered. The question is followed by multiple choice answers, each of which is associated with a different frame. One of the answers is correct, and the remaining answers are incorrect. For each answer, a direction is given to press a respective command button. Upon depressing the command button associated with the answer chosen, the control network 36 causes the drive unit 27 to move the film 22 to a predetermined position.

Whether the student chooses the correct answer or an incorrect answer, our system operates to drive the film ahead (or in reverse) a predetermined number of frames. If the answer chosen was the correct answer, the drive unit 27 will be made to operate in the same manner when the next selection is made. However, if the answer chosen was an incorrect answer, the student is directed to depress the return button, indicated by the button marked "R." Until the "R" button is depressed, the control network 36 will keep the drive unit inoperative to move the film 22. Upon depressing the "R" button, the control network 36 conditions the drive unit 27 to reverse the direction of rotation of the drive sprocket 25. The film 22 is thus moved in the reverse direction until the film frame is reached that represents the last correct answer chosen by the student, i.e., the film frame in the above example from which the incorrect answer was chosen.

To further aid in understanding the operation of our invention, the following is an example of a portion of a short course of study on the subject "Introduction to Computer Number Systems."

"The word "decimal" refers simply to the fact that our common number system uses only 10 different numerals, or digits. With these 10 single digits (0, 1, 2, and so on to 9), we can count up to 9. Beyond 9 we must use combinations of these numerals, such as one and zero for (10), 11 for eleven (11), etc.

"Some number systems use more than 10 different single digits, and some use fewer. For example, the ancient Babylonians used a system with 60 different single numerals. Modern electronic computers, on the other hand, use a system with one or two different numerals, 0 and 1. To understand how arithmetic can be done in such a system, we are going to have to discuss number systems in some detail. But first, let's review some of the terms used in discussing arithmetic. Try the following question:

"In multiplication, 3 x 4=12, the number '12' is called the product and the numbers 3 and 4 are called "(a) quotients depress button '7'
(b) factors depress button '8'
(c) powers depress button '9'"

If the student depresses button "7," the control network 36 causes the drive unit 27 to move the film 22 ahead a predetermined number of frames (e.g., seven frames), on which the following information is presented: "Your answer on frame 4 was: 'quotients.'

"A 'quotient' is the number resulting from a division. For example, in a division $$3 \overline{)18}^{\phantom{0}6}; \text{ that is, } \frac{18}{3} = 6$$

the number 6 would be called 'the quotient'. But our question concerned multiplication, not division. Press button 'R' and try again."

The film 22 cannot be moved again until the "R" button is depressed. Then the drive unit 27 reverses the direction of the film to move it back to the frame that contained the question to which the wrong answer was made.

The same result would occur if the student had selected the answer "powers" and had depressed button "9." He would have been advised that this answer was incorrect and directed to depress the "R" button and try again.

When the correct answer "factors" is chosen and the button "8" is depressed, the drive unit 27 is caused to advance the film a predetermined number of frames. The frame then presented to view advises the student that the answer was correct, provides additional information, and asks another question followed by multiple choice answers, e.g., "Your answer was 'factors'.

"You are correct. The numbers that are multiplied together to form a product are called 'factors'. Thus, in the multiplication

3×4=12

3 and 4 are the factors, and 12 is the product.

"In the multiplication

2×3×5=30

Would the 2, 3 and 5 all be called 'factors'?

"(a) Yes, depress button '3'
(b) No, depress button '5'."

If the student selected the "yes" answer and pushed the button number "3," the next frame presented to view would reveal that the answer was correct, so that projector operations could proceed in the same fashion as before. If the "no" answer was selected and the button numbered "5" was depressed, the next frame presented to view would reveal that the answer was incorrect, possibly provide additional instruction, and direct the student to operate the "R" button.

As will become more evident, our system is capable of permitting variations in the permissible operations following the selection of an incorrect answer. For example, the frame to which the student was directed when first selecting the incorrect answer may be the first in a short series of succeeding frames that provide a desired amount of "extra instruction" for the student before finally redirecting him to the frame from which he initially chose the incorrect answer. But regardless of the particular manner of programming the system for operation in response to incorrect answers, the last frame viewed in response to a correct answer is made the new "home" or starting base from which the succeeding frame count is initiated. The mechanism in accordance with our invention for accomplishing the desired result is that shown in FIGURES 2–8.

Figure 2:
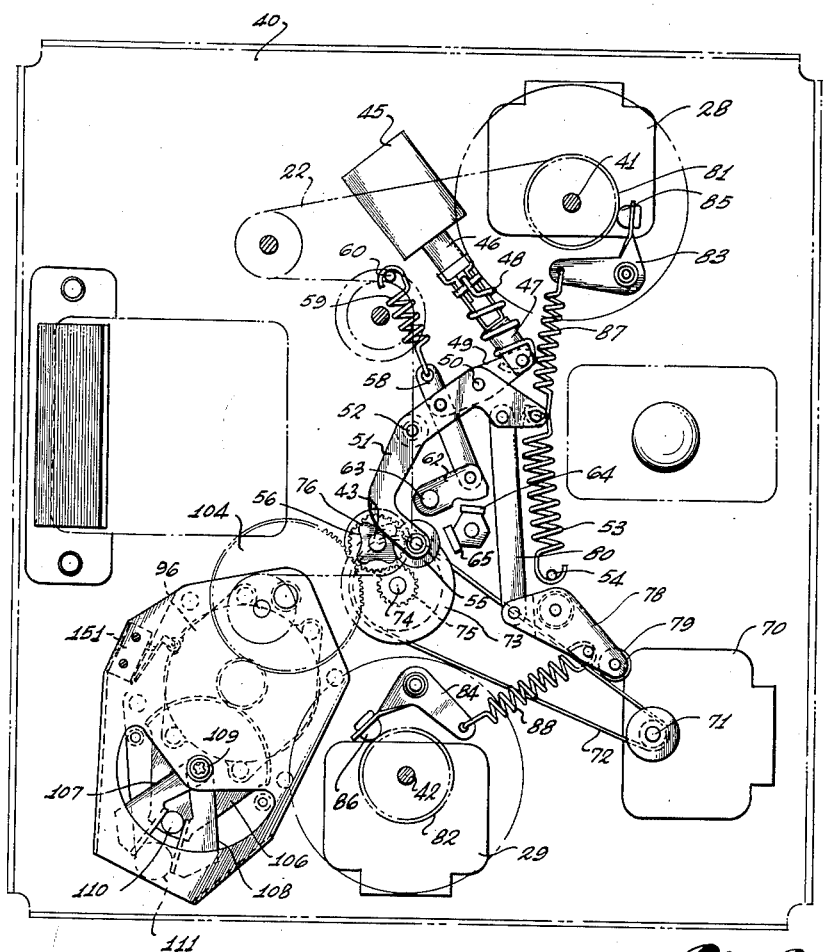
FIGURE 2 is a top plan view of the mechanical elements, and electromechanical control means therefor for effecting the selective operation of the drive unit to move the film in a desired direction and to a predetermined position.
Figure 3:
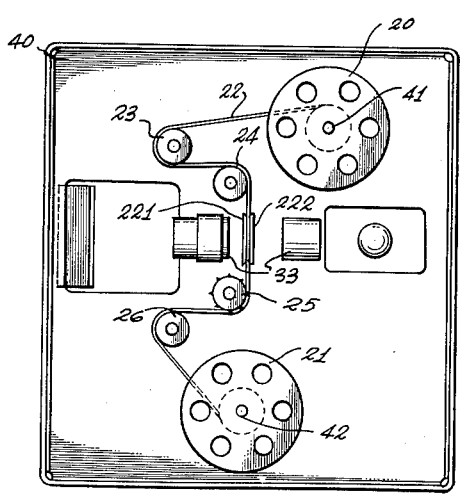
FIGURE 3 is a top plan view of the reels, the sprockets and film clamping means, showing the positions of these elements relative to the parts shown in FIGURE 2.

Referring to FIGURES 2 and 3, there is shown a deck 40 through which extends a pair of shafts 41, 42 for the torque motors 28, 29 and a shaft 43 on which the drive sprocket 25 is mounted. As indicated, the reels 20, 21, the spools 23, 24, 26, and the drive sprocket 25 are mounted on one side of the deck 40 and the operative mechanisms for the drive sprocket 25 and the torque motors 28, 29 are located on the opposite side of the deck 40. Such operative mechanisms include a solenoid 45 that has a split plunger composed of parts 46, 47 held together by a torsion spring 48. The outer end of the part 47 is secured to one end of a bell crank 49 that is pivotally mounted, as at 50, on a larger bell crank 51. The larger bell crank 51 is pivotally mounted on a pin 52 that is fixed with respect to the deck 40.

The pin 50 is located between the fixed pin 52 and one end of the large bell crank 51. Such end of the large bell crank 51 is engaged by one end of a large tension spring 53, which is connected at its opposite end to a fixed pin 54. At its other end, the large bell crank 51 carries a sprocket indexing wheel 55 that engages a four-lobed detent wheel 56 that is fixed to the drive sprocket shaft 43. Due to the action of the tension spring 53, the large bell crank 51 is urged in a clockwise direction, whereby to normally force the indexing wheel 55 thereon into engagement with the detent wheel 56. As shown, the radius of curvature between adjacent lobes on the detent wheel 56 is the same as the radius of curvature of the indexing wheel 55 on the bell crank 51.

The end of the smaller bell crank 49 that is opposite the plunger part 47 is located between the pins 50, 52, and is secured to a link element 58 adjacent one end thereof. The link 58 is urged in a direction tending to move the bell crank 49 clockwise, and to this end, a tension spring 59 is connected between a fixed pin 60 and the end of the link 58 adjacent the bell crank 49.

Rotation of the bell crank 49 about the pin 50 is limited through a bell crank 62 that is pinned to a rotatable shaft 63. As shown, the bell crank 62 is connected to the end of the link 58 opposite the spring 59, so that counterclockwise rotation of the bell crank 49 causes the bell crank 62 to be rotated clockwise. A stop member 64 is fixed on the deck 40, and has a portion disposed in the path of movement of the bell crank 62. When the bell crank 62 engages the stop 64, the link 58 cannot be moved any further in that direction, whereupon the bell crank 49 cannot longer rotate about its pin 50.

The magnetic attraction of the solenoid 45 for the plunger structure 46—48 is great enough to overcome the tension of the spring 53 on the bell crank 51. Thus, when the link 58 and the bell crank 62 bottom against the stop 64, continued retraction of the plunger structure 46—48 results in movement of the bell crank 51 about its pivot 52, and hence, the bell crank 49 moves with the bell crank 51.

Rotation of the bell crank 51 continues until the indexing wheel 55 moves against a stop 65 lying in its path. This action frees the drive sprocket shaft 43 for rotation, whereby to permit the drive sprocket 25 to be rotated to move the film.

To rotate the drive sprocket shaft 43, we provide a drive motor 70 having an output spindle 71 around which a belt 72 is trained. The belt 72 is also trained around a pulley 73 that is mounted on a shaft 74 which carries a gear 75. The gear 75 meshes with the gear 76 that is fixed to the drive sprocket shaft 43, so that rotation of the pulley 73 by the belt 72 causes the drive sprocket shaft 43 to be rotated.

There is normally sufficient slack in the belt 72 so that the drive motor spindle 71 slips with respect to the belt, and the belt is not put in motion. To set the belt in motion, it is necessary to take up the slack, and for this purpose we provide a bell crank 78 that is pivotally mounted on the deck 40, and which carries an idler 79 that can be moved against the adjacent portion of the belt and make it taut. The normal position of the bell crank 78 is one in which the idler 79 is spaced from the belt, as shown in FIGURE 2.

To actuate the bell crank 78, and hence the idler 79, so that the belt 72 is made taut and will be set in motion by the drive spindle 71, we provide a link 80 that is connected at its ends to the bell crank 78 and to the bell crank 51. When the bell crank 51 rotates counterclockwise, the link 80 moves in a direction to rotate the bell crank 78 clockwise and bring the idler 79 against the belt 72.

As will be apparent, deenergizing the solenoid 45 results in the belt 72 being made slack, and the link and bell cranks return to their neutral positions. The indexing wheel 55 is brought to bear against the detent wheel 56, and spring tension forces the indexing wheel 55 into position between adjacent lobes of the detent wheel 56. The detent wheel is so positioned that when it is thus engaged by the indexing wheel 55, the film is in a position wherein one of its frames is centered for display on the screen 31.

While the belt 72 is being driven, the drive sprocket shaft 43 operates an indexing switch mechanism that is utilized to control subsequent operations of the drive unit 27. In FIGURE 1, this control is indicated by a mechanical connection between the drive sprocket 25 and the control network 36. Referring to FIGURES 6–8, along with FIGURES 2 and 3, we provide a commutator type switch that employs a wafer or disc support 90 that is fixed to a pin 91. As shown, the pin 91 is secured at one end in the housing of a solenoid 89 and is surrounded by the control coil 89' of the solenoid 89.

Disposed above the wafer 90, and adapted to engage printed circuit conductors thereon, are two pairs of wiper contacts 92—93, 94—95. The wipers 92—95 are carried on a support plate 96. In this connection, the wipers in each of the pairs 92—93, 94—95 are electrically connected together, as by short conductive elements 97, 98, which in turn are secured to the plate 96.

The plate 96 and hence the wiper contacts 92—95, are adapted for angular movement about the axis of the pin 91. To this end, the plate 96 is secured to a gear 99 that is rotatably mounted on the pin 91.

Rotation of the gear 99 is effected through a clutch member 100. The clutch member 100 has a central hub 101 that extends into the solenoid 89, and which is adapted for both sliding and angular movement relative to the pin 91. The confronting faces of the clutch member 100 and the gear 99 are adapted for engagement, as through interlocking teeth or serrations, so that rotation of the clutch member 100 effects rotation of the gear 99. A compression spring 102 surrounding the hub 101 is used to normally bias the clutch member 100 into meshing engagement with the gear 99.

The clutch member 100 also serves as a conventional gear, being provided with gear teeth around its periphery that are in meshing engagement with the teeth on a spur gear 103. The spur gear 103 is adapted for unitary rotation with an enlarged gear 104 that is driven directly by the gear 76 on the sprocket drive shaft 43.

The clutch member 100 also serves as a plunger or armature for the solenoid 89. When the solenoid winding 89' is energized, the clutch member 100, which is made of magnetic material, is caused to move axially along the pin 91 until the inner end of the hub 101 engages a stop, e.g., a radial shoulder 91' on the pin 91 that is disposed in the path of the hub 101. As shown in FIGURE 7, the clutch member 100 in its retracted position is disengaged from the gear 99, but remains in engagement with the gear 103. Thus, the wiper assembly 92—95 is made selectively rotatable by the drive sprocket shaft 43 by means of the solenoid 89.

When the clutch member 100 is retracted upon energizing the winding 89', it still rotates with the gear 103 and with a minimum of friction. This is due to the fact that when the inner end of the hub 101 strikes the radial shoulder 91', the disc portion of the clutch member 100 is still spaced from the solenoid housing. Thus, rubbing surfaces are kept at a minimum.

In our indexing switch assembly, the wipers 92—95 are arranged to be automatically returned to a predetermined neutral position whenever the clutch member 100 is disengaged from the gear 99. To effect such automatic action, we provide a sector gear 106 and a pair of levers 107, 108 that are all mounted for rotation relative to each other on a pin 109. The levers 107, 108 are both adapted to be moved by the sector gear 106. To this end, the sector gear 106 is provided with a pin 110 that is disposed between the levers 107, 108, and is adapted to engage one or the other of the levers 107, 108, depending upon the direction of rotation of the sector gear 106.

As shown in FIGURES 6 and 8, the pin 110 is adapted to move between confronting portions of the levers 107, 108. Also, a stationary pin 111 is provided as a stop beyond which the levers 107, 108 on either side thereof cannot be moved. Thus, the pin 110 can only move the levers 107, 108 away from the pin 111. The stationary pin 111 also constitutes the "home" position for the sector gear 106, in that, when the clutch member 100 disengages the gear 99, the levers 107, 108 are utilized to force the sector gear 106 to a position wherein both of the levers 107, 108 are in abutment with the pin 111. For this purpose, we provide a tension spring 112 that is connected to both of the levers 107, 108 and biases them toward each other. Thus, as will be seen with reference to FIGURES 2 and 8, if the sector gear 106 is rotated clockwise, due to counterclockwise rotation of the gear 99, the pin 110 forces the lever 107 away from the stationary pin 111. During such movement of the lever 107, the lever 108 is maintained in a stationary position wherein it is in abutment with the stationary pin 111.

When the gear 99 is released by the clutch member 100, the sector gear 106 is caused to move in a counterclockwise direction. This action results from a spring 112, which is effectively anchored at one end (with the lever 108) to the stationary pin 111. The spring pulls the lever 107 toward the stationary pin 111. The spring thus causes the lever 107 to force the pin 110 ahead of it, whereby to move the sector gear 106 counterclockwise. This movement of the sector gear 106, which continues until the lever 107 is brought into abutment with the stationary pin 111, imparts clockwise rotation to the gear 99. When the sector gear 106 stops, the wiper assembly 92—95 is held stationary until the clutch member 100 again engages the gear 99 and is set in rotation by the sprocket drive.

FIGURES 12a and 12b illustrate a circuit of our invention for controlling the operation of the film. Referring to FIGURES 12a and 12b, the buttons numbered "1" through "10" are each adapted to actuate respective sets of normally open switches a, b, c. The "R" button is arranged to control the condition of a group of normally open switches 121—123 and one normally closed switch 130, all such switches 121—123, 130 being ganged.

Switches operated by the "1"—"10" and "R" buttons are connected to different circuit elements of the printed circuit that is on the wafer 90. In this connection, the wafer 90 carries three concentric conductor rings, including continuous inner and outer conductors 132, 133. The intermediate ring is a split ring formed of two substantially semi-circular segments 134, 135. Arranged in a circle concentric with these ring conductors are a plurality of spaced contacts 136—146, of which, as shown, the contacts 137—146 are connected to the respective switches 1c—10c. The "c" switches are connected to a common lead 147 that is to be connected to a source of potential. Accordingly, closure of one of the buttons "1"—"10" causes its "c" switch to close and connect the associated contact on the wafer 90 to the lead 147. As shown, when the switch 121 controlled by the "R" button is closed, it connects the wafer contact 136 to the lead 147.

Referring to FIGURE 6 along with FIGURES 12a, 12b, it is to be noted that meshing teeth or serrations on the clutch member 100 and the gear 99 are the same in number as the number of possible positions in which the wipers 92—95 can be placed. This arrangement of our invention insures that wherever the wipers 92—95 are stopped, the wiper 92 is located on a contact element.

The wipers 92—95 are arranged so that the wiper 92 will ride on the fixed contacts 136—146; the wiper 93 will ride on the outer ring 133; the wiper 94 will ride on one or the other of the segments 134, 135; and the wiper 95 will ride on the inner ring 132. The pairs of wipers 92—93, 94—95 are indicated in FIGURE 12 to be linked for unitary rotation to a clutch-controlled operator 150. The operator 150, which will be recognized to embrace the gear arrangement of FIGURE 6, is controlled by the solenoid 89.

The operator 150 is also adapted to control a switch 151 that is closed when the wipers 92—95 are in the neutral position. Referring to FIGURE 8 along with FIGURE 12a, the switch 151 is one that is actuated by the wiper support plate 96. In this arrangement, the switch 151 has an operator arm 152 that is normally biased outwardly, and which carries a roller 153. The switch 151 is closed when the arm 152 is in its outer position, and is opened when the arm 152 is depressed.

In the neutral position of the plate 96, the roller 153 rests in a notch 154 in the periphery of the plate 96. When the gear 99 and the plate 96 thereon are rotated from their neutral position, the plate cams the roller 153 out of the notch 154, thereby depressing the arm 152 and opening the switch 151. When the gear 99 is released and returned to the neutral position, the roller rides back into the notch, allowing the arm 152 to move out and effect closure of the switch 151.

The solenoids 45, 89, the torque motors 28, 29, and the driver motor 70 are synchronized in their operations through the use of a number of relays 161—165. As shown, the coil 166 of the relay 161 controls four switches having movable contacts 167—170 and associated pairs of fixed contacts a, b. The relay coil 171 of the relay 162 also operates four movable contacts 172—175 that have associated pairs of fixed contacts a, b. The coils 176, 177 of the relays 163, 164 are each similarly adapted to control three movable contacts, indicated at 178—180 and 181—183, and the coil 184 of the relay 165 controls a pair of movable contacts 185, 186, all of which have associated pairs of fixed contacts a, b.

Power for the various electrically operable devices is provided through an A.-C. power source 190. In the circuit arrangement of FIGURES 12a and 12b, the torque motors 28, 29, the drive motor 70 and the solenoid 45 are adapted to be selectively supplied with A.-C. power from the source 190. The relays 161—165 and the solenoid 89 are operable from a D.-C. source 191. The D.-C. source 191 may, as shown in FIGURE 12b, be established by means of a rectifier 192 and filter network 193 that are coupled, as through a transformer 194, to the A.-C. source 190. As shown, the positive terminal 196 of the D.-C. source 191 is connected to the lead 147 and to the contact arm 169 that is operated by the relay 161. The negative terminal 197 of the source 191 is connected to one end each of the relay coils 161—165 and to the control winding 89' of the solenoid 89.

The remaining connections by which the various relays, motors and solenoids are made operable will be explained with reference to the sequence of operations in our unique system. Let the condition first assumed be one in which the wipers 92—95 are in their neutral position, as indicated in FIGURE 12a, and that the film is in a position to permit the student to read the first quantum of information in the course of study. To permit the student to read the information on the frame, the projector bulb 32 is illuminated. As shown in FIGURE 12b, the bulb 32 is connected across the A.-C. source 190 through a circuit that is traced from one terminal of the source 190, the bulb 32, and the contact 175a and arm 175 to the other terminal of the source 190. At this moment, all pushbuttons are in the undepressed positions. And prior to energization of any of the relays 161—165, all the movable arms of such relays are in engagement with their "a" contacts.

Assume that after the student has read the material on the projected frame, he depressed the "6" button as the result of the answer he selected to the question given. This causes the switches 6a, 6b, 6c to be closed, whereupon through the closed switch 6b, the coil 176 of the relay 163 is energized. In this connection, all the switches 1b—9b are connected across lines 199, 200 that are connected, respectively, to the contact 186a of the relay 165 and to the relay coil 176 of the relay 163. The movable contact arm 186 of the relay 165 is connected to the contact 169a of the relay 161, and the arm 169 is connected to the positive lead 147.

Thus the circuit for energizing the relay 163 is traceable from the positive terminal 196, the lead 147, the switch 169a, the switch 186a, the switch 6b, and the relay coil 176 to the negative terminal 197. Thus, the arms 178—180 are moved to engage the respective "b" contacts.

The operation of the relay 163 is a step to prepare the motor 70 to start. To this end, the motor has shading coils 201, 202 adapted to have their ends connected to cause the motor to operate in opposite directions. The coil 202 has one end connected to the contact arm 178 of the relay 163, and its other end connected to the fixed contact 178b. Similarly the coil 201 is connected to the arm 181 and the fixed contact 181b of the relay 164.

The torque motors 28, 29 each have resistors 203, 204 in series with their control networks. The resistors 203, 204 are both connected to the main field winding 205 of the motor 70, which winding 205 is connected, together with the torque motors 28, 29, to one side of the A.-C. source 190. The resistor 203 is also connected in parallel with the relay contact arm 179 and fixed contact 179b, whereby it is shorted when the relay 163 is energized. Such shorting of the resistor 203 causes the torque exerted by the torque motor 28 on its shaft to differ from the torque exerted by the torque motor 29 on its shaft. Referring to FIGURE 1, it will be apparent that since the torque motors exert torques in opposite directions, it is necessary that the torque be reduced for the torque motor that exerts torques in the direction tending to halt movement of the film 22.

As shown, the solenoid 45 has its control winding 45' connected across the field winding 205. Thus, the operations of the motor 70 and the solenoid 45 are initiated substantially simultaneously.

When the wipers 92—95 are initially in neutral position, our system operates so that when the drive sprocket 25 is rotated, the solenoid 89 is deenergized so as to permit the wipers to be driven. For this purpose, the relay 162 is operated, and this is done through operation of the relay 163. The path is through the positive lead 147, the arm 169 of the relay 161, the fixed contact 169a, the arm 180 of the relay 163, the fixed contact 180b, the closed switch 151, and the relay coil 171 to negative potential.

The condition of the solenoid 89 is controlled through the arm 172 and the associated contacts 172a, 172b. As will be observed, the control coil 89' of the solenoid 89 is in circuit with the coil 171 of the relay 162 when it is first energized. The path includes the coil 89', the fixed contact 172a, the arm 172, the closed switch 130, the fixed contact 180b, the arm 180, the fixed contact 169a, and the arm 169. However, energizing the relay coil 171 causes the arm 172 to disengage the contact 172a, whereupon the solenoid 89 is deenergized to effect a driving connection between the drive sprocket 25 and the wipers 92—95.

The relay 162 is arranged to be held in when energized. The circuit for this purpose is made through the relay coil 171, the contact 172b, the arm 172, the closed switch 130, the fixed contact 180b, the arm 180, the fixed contact 169a and the arm 169.

When the relay 162 is operated, A.-C. power is made available to operate the torque motors 28, 29, the drive motor 70, and the solenoid 45. The A.-C. path includes the contact 175b of the relay 162, the arm 175, the contact 170a of the deenergized relay 161, and the arm 170. As will be seen, this connects A.-C. devices across the A.-C. source 190.

In the system of our invention, the motor 70 operates through the drive sprocket 25 to drive the wipers 92—95 through the smallest angle necessary to connect the contacts 92, 93 to the "c" switch of the depressed button. In the example here given, the wipers 92—95 are driven counterclockwise from the neutral position until the wiper 92 engages the wafer contact 142 that is connected to the switch 6c.

When the wiper 92 reaches the contact 142, current flows through the positive lead 147, the switch 6c, the wipers 92, 93, the ring conductor 133, the arm 173, the contact 173b, and the coil 166 of the relay 161 to negative potential, thereby to energize the relay 161. The relay 161 remains energized through a holding circuit that includes the coil 166, its contact 168b and arm 168, the ring conductor 133 and wipers 92, 93 and the switch 6c.

Since energization of the relay 161 results in the arm 170 being disengaged from its contact 170a, the A.-C. path to the motors 28, 29, 70 and the solenoid 45 is broken, whereby to stop the motors and deenergize the solenoid 45. Simultaneously, the movement of the arm 169 to disengage its fixed contact 169a, interrupts the D.-C. circuits for the coils 171, 176 of the relays 162, 163, thus causing the relays 162, 163 to drop out.

The relay 161 is dropped out by the operation of circuit means for resetting depressed buttons. Such circuit includes a solenoid having a control coil 210 that is connected between the contact 169b of the relay 161 and the negative terminal 197 of the D.-C. source 191. The coil 210 is adapted to actuate a plunger, indicated generally at 211, to cause any depressed button "1"—"10," "R" to be returned to its outer position.

Thus, when the relay 161 is energized to close the switch 169—169b, the reset control solenoid coil 210 is energized, thereby returning the button "6" to its outer position. Since the switches 6a, 6b, 6c are thereby opened, the energizing circuit for the relay coil 166 is broken, and the relay 161 drops out.

The frame that is brought to a stop adjacent the projector bulb 32 may now be viewed by the student. In this situation, the wipers 92—95 remain in the position they reached, i.e., at the wafer contact 142, until a subsequent operation is initiated. How the wipers are moved in such initial operation is based on whether the answer chosen was correct or incorrect, i.e., whether the "6" button was the correct one depressed. The new frame will advise the student as to the status of his choice.

If the answer chosen was correct, the next button depressed results in the same sequence of operations above described, but with one exception. The momentary energization of the solenoid 89 just prior to the rotation of the drive sprocket 25, causes the wipers 92—95 to be released, and returned to neutral position.

If the answer chosen was incorrect, the student will be instructed to depress the "R" button. When he does so, the motor 70 is conditioned to operate in the reverse direction and to move the wipers 92—95 back to the neutral position, i.e., the solenoid 89 is not energized in this operation and automatic return of the wipers is prevented. In this manner, the previous frame is returned to the viewing position.

To accomplish the operation described in connection with the "R" button, the switch 122 is utilized to energize the coil 177 of the relay 164. The relay 164 is arranged like the relay 163, except to cause the motor 70 to run in reverse. An arrangement for accomplishing this is one in which the relay 165 is energized to in turn cause the coil 177 of the relay 164 to be energized, the D.-C. path therefor being through the switch 169—169a, the switch 186—186b, a lead 212 from the contact 186b, the switch 122, the inner ring conductor 132, the conductor segment 134, and the relay coil 177.

The pickup of the relay 164 causes current to flow from the positive lead 147 through the switch 169—169a, the switch 183—183b, the switch 123 and the coil 171 of the relay 162, whereby to energize the relay 162 and establish the needed A.-C. paths for driving the motor 70 in the reverse direction. The open condition of the switch 130 prevents the solenoid 89 from being energized.

When the wipers 92—95 reach the neutral position, the coil 166 of the relay 161 is energized, whereby to stop the motor in the manner previously described. This is accomplished through the D.-C. path through the switch 121, the wafer contact 136, the ring conductor 133, the switch 173—173b of the relay 162, and the coil 166 of the relay 161. The system is then ready for operations to proceed, as first above explained, upon depressing one of the buttons "1"—"10." The relay 161 holds itself in, as previously explained until the "R" button is reset.

As will be apparent, to operate the relay 165 for the purpose described, its coil 184 may be adapted through a suitable switch to be connected directly across the D.-C. source, upon closure of such switch by depressing the "R" button. However, a preferred arrangement of our invention is one wherein the relay 165 is utilized so that, following an operation of one of the buttons "1"—"10" pursuant to selection of a wrong answer, the circuit is conditioned to prevent any but the "R" button from controlling the next circuit operation. This arrangement will now be described with reference to FIGURES 9 and 10 along with FIGURES 12a and 12b.

A light-sensitive device such as a photo-diode 215 is located adjacent an edge of the film 22, e.g., the sound track. This portion of the film is arranged along the frame so that light passes through to the diode or not, depending on whether the answer selected was correct. For example, this portion of the film, adjacent the frames that are those that might be projected pursuant to wrong answer choices, is darkened as at 216. But the same portion of the film adjacent the frame that corresponds to the correct answer is undarkened, as indicated at 217.

If the frame that was projected after depressing the "6" button is incorrect, the high resistance state of the diode 215 is reflected through a transistor amplifier network 218, which, for example, may be a conventional Schmidt trigger circuit, to energize the coil 188 of the relay 165. Accordingly, upon depressing the "R" button, current flows through the D.-C. path from the positive lead 147 through the switch 169—169a, the switch 186—186b, the switch 122, the ring conductor 132, the conductor segment 134, and the coil 177 of the relay 164. Thereupon the motor 70 drives the wipers 92—95 in reverse as above described.

From the foregoing, it will be seen that the condition of the relay 165 determines whether the "R" button or one of the buttons "1"—"10" can control circuit operations. In the unenergized and energized conditions, respectively, the positive lead 147 (through the switch 169—169a) is connected to the leads 199, 212. Thus, the "R" button only can control operations when the relay 165 is energized, and only one of the buttons "1"—"10" can control operations when the relay 165 is not energized.

In the use of a photo-diode as above described, we arrange to illuminate the projector bulb 32 only when the film is stopped. Control for the bulb is through the switch 175—175a of the relay 162. As will be seen, when the relay 162 is energized, so as to open the switch 175—175a and close the switch 175—175b, the projector bulb 32 is disconnected from the A.-C. source 190. Then when the relay 162 drops out, whereby to open the switch 175—175b and close the switch 175—175a, the bulb 32 is connected across the A.-C. source and illuminated. In this manner, no light passes through the film, and the photo-diode 215 is inoperative for detection purposes, while the film is in motion. In this connection, during movement of the film under the control of the start relay 162, a shorted connection is effected between the leads 199, 212. This shorted connection is through the switch 174—174b of the relay 162.

The foregoing description has explained only the circuit operation for driving the film and wipers in one direction from a correct answer position—counterclockwise as viewed in FIGURE 12a—and returning them to such position when it is necessary to operate the "R" button. But the system operates in the same manner for situations wherein the wipers are to be moved clockwise from a correct answer position, and counterclockwise when it is necessary to return them to such position. As shown, the wafer contact 146 is connected to the switch 10c, and the switch 10b is connected to the conductor segment 134 and the relay coil 164.

When the "10" button is depressed, the operations above explained take place so that the relay 164 is energized to drive the wipers clockwise from the correct answer positions, i.e., from the neutral position of the wipers. To drive the wipers counterclockwise when it is necessary to return them to such position, the connection is made through the lead 212, the switch 122, the segment 132 to the segment 135, and to the relay coil 176.

The switches 124—129 are utilized in our circuit for a "slewing" operation, in which the film is driven to any desired position, e.g., as when initially positioning the film to project the initial frame of a course of study onto the screen 31. As shown, the switches 124—126 are ganged, as are the switches 127—129. The switches 124, 125, 127, 128 are all directly connected to the contact 189a of the relay 161. The switch 124 is also connected to the relay coil 176, and the switch 127 is connected to the coil 177 of the relay 164. Both the switches 125, 128 are connected to coil 89'. And the switches 126, 129 are connected in parallel between the arm 175 and contact 175a of the relay 162.

When the respective sets of switches 124—126, 127—129 are operated, the switches 124, 127 connect the positive lead 147 (through the switch 169—169a) to the coils 176, 177, and thereby energize the relays 163, 164. The switches 125 and 128 serve to cause the solenoid control coil 89' to be energized, whereupon the wipers 92—95 are automatically returned to the neutral position, and the switch 151 closes. Current then flows through the switch 169—169a, the switch 180—180b (or 183—183b), the switch 151, and the coil 171 of the "start" relay 162. Thereupon the motor operates to drive the film in the desired direction, stopping when the switches 124—126 (or 127—129) are released. As will be apparent, the sets of switches 124—126, 127—129 are operated separately.

The switches 126, 129 serve to keep the projector bulb 32 illuminated during the slewing operation. Thus, when the film is stopped after slewing, it can readily be determined whether the desired frame is being projected.

Our invention also includes means to indicate or record one's progress through a course of study. Such means include an error counter 220 (see FIGURE 12a) that is connected between the switch 121 and negative potential. When it is necessary to depress the "R" button, the switch 121 connects the counter across the D.-C. source 191. The counter 220 operates at such times to indicate the fact that a wrong answer was chosen.

A recorder (not shown) is connected to the switches 1a—10a, to the contacts 167a, 167b of the relay 161, to the arm 185 and the contacts 185a, 185b of the relay 165, and across the rectifier 192. The recorder is thus provided with data from which to make a record of which button selections were made (via the operations of the buttons "1"-"10"), whether the answers corresponding to the selections were correct or incorrect (via the photo relay 165), and when the individual operations end (via the switches 167a, 167b).

Since individual frames are projected onto the screen 31 for prolonged periods of time, it is important to provide means to minimize the effects on the film of heat from the projector bulb 32. In our invention, we provide protection for the film by clamping the film, at the frame being projected, between a pair of transparent plates 221, 222 (see FIGURE 11), such as glass plates.

One plate 221 is fixed with respect to the deck 40 (FIGURE 2) in a position wherein the film rides along the face of the plate 221 that confronts the other plate 222. The other plate 222 is adapted to be moved toward and away from the fixed plate 221. The desired operation for the movable plate 222 is to cause the film to be firmly clamped in position while the drive sprocket 25 is decoupled from the motor, and to free the film just prior to the drive sprocket being rotated. For this purpose the plate 222 may, as indicated at 223, be operated through lever means from the shaft 63 of the bell crank 62.

It should be noted that the drive connection for the drive sprocket is not made until the bell crank 62 has rotated to a point where it strikes the stop 64. Accordingly, upon the solenoid 45 being energized, the separation of the plate 222 from the film occurs before the film is set in motion. Conversely, the film always comes to a stop before the plate 222 moves to the clamping position.

Although we have illustrated and described a particular embodiment of our invention, it will be apparent that various modifications can be made in such embodiment without departing from the spirit and scope of our invention, e.g., each of the buttons "1"-"10" can be made to effect movement of the film in either direction, and through any desired number of steps or frames, merely by changing connections between the buttons and the contacts on the wafer 90. If desired, the controls may be arranged so the buttons cause the film to advance in a progression, e.g., the "1" button causing the film to advance one frame; the "2" button causing the film to advance three frames; the "3" button causing the film to advance five frames; etc. By such progression, the lower numbered buttons can be used for each of a number of successive questions. Of course, the buttons need not be numbered; lettered buttons will serve as well, and may be more advantageous in certain situations, e.g. in presenting a basic course in arithmetic, numbers on buttons may be equated to answers by beginning students. Further in this connection, the display may be varied, as by placing alternative answer choices on a frame so they appear on the screen beside the button with which they are associated; in such case, the student is merely apprised to depress the correct button. Accordingly, we do not intend that our invention be limited, except as by the appended claims.

We claim:

1. In a projector having a reel mechanism and an optical system for projecting film images on a screen, wherein a reversible motor is provided to operate the reel mechanism, apparatus comprising: a film strip carried by the reel mechanism on which a plurality of frames contain items of information that are so interrelated as to have a logical sequence, the items that are consecutive in the sequence being on non-consecutive frames; control means for the reel mechanism to effect movement of the film; manually operable means to effect operation of said control means so as to cause the film always to be moved a manually selected number of frames with reference to an initial reference frame that is being projected on the screen; said manually operable means and control means comprising at a given time means related to certain numbers of frames less than said plurality of said frames; means for making a selected one of said frames a new initial reference frame for said manually operable means and control means to effect a stepwise progression through said plurality of frames; and code means on the frame that is being projected on the screen to identify the operation of said manually operable means that is needed to cause the film to move a predetermined number of frames.

2. Self-tutoring apparatus comprising: a housing having a panel supporting a viewing screen; a projector in said housing having a reel mechanism and an optical system for projecting film images on said screen; a film strip carried by the reel mechanism on which successive frames of a plurality thereof contain interrelated items of information that have a logical sequence, the items that are consecutive in the sequence being on non-consecutive frames; drive means for moving said film strip in one direction or the other past the optical system; a control network for said drive means, said control network including switch means to condition said drive means for moving said film strip, said switch means being operable to cause said drive means to move the film a predetermined number of frames from an initial reference frame that is being projected on said screen; manual control means for said switch means at said panel for selecting said predetermined number of frames; said control network and manual control means comprising at a given time means related to certain numbers of frames less than said plurality of said frames; means for making a selected one of said frames a new initial reference frame for said control network to effect a stepwise progression through said plurality; and code means on the frame that is being projected on the screen to identify the operation of said manual control means that is needed to cause the film to move said predetermined number of frames.

3. Self-tutoring apparatus comprising: a housing having a panel supporting a viewing screen; a projector having a reel mechanism and an optical system for projecting film images on said screen; a film strip carried by the reel mechanism on which frames contain items of information that are so interrelated as to have a logical sequence, the items that are consecutive in the sequence being on non-consecutive frames; sprocket means engaging said film strip; a reversible drive motor for said sprocket means; electromechanical clutch means for selectively connecting said sprocket means to the motor; means to selectively operate said clutch means; switch means having contacts movable by said sprocket means; electromechanical means adapted to prevent movement of said movable contacts by said sprocket means; means to automatically locate said movable contacts in a predetermined position when they are not coupled to said sprocket means; a control network including second switching means to effect operation of said clutch means; manual control means to direct movement of the film a predetermined number of frames from a frame that is being projected on the screen; visible code means on the frame that is being projected on the screen to identify for the student the operation of said manual control means that is needed to cause the film to move said predetermined number of frames; circuit means operable by said manual control means to operate said clutch means to connect said motor and sprocket means; and means operable after said film has moved said predetermined number of frames to cause said circuit means to operate said clutch means to disconnect said sprocket means from said motor.

4. A combination as defined in claim 3, wherein said means to selectively operate said clutch means includes a solenoid having a plunger; and means operable by said plunger when the solenoid is energized to cause said clutch means to engage said sprocket means.

5. A combination as defined in claim 4, wherein said clutch means includes a belt and pulley drive operable from the motor, the belt being normally slack so as not to be operable by the motor, but adapted to be made taut so as to be operable by the motor; and means in said plunger operable means to cause said belt to become taut and to drive said sprocket means when said solenoid is energized.

6. A combination as defined in claim 3, wherein said switch means includes a wafer switch having wipers movable relative to conductor elements thereon; and a rotatable member supporting said wipers; and said electromechanical means includes a clutch member of magnetizable material normally engaging such wiper-supporting member, said clutch member being drivably connected to said sprocket means; and a solenoid including said clutch member for selectively disengaging said clutch member from said wiper-supporting member.

7. A combination as defined in claim 6, wherein said automatic locating means includes spring means coupled to said wiper-supporting member for moving it to a predetermined position whenever it is disengaged from said clutch member.

8. A combination as defined in claim 5, wherein the film along one edge has portions with different light-transmission characteristics, said portions adjacent correct answer frames having a different light-transmission characteristic than said portions of the remaining frames; a light-sensitive element adjacent said one edge of the film, said light-sensitive element having a predetermined output condition when one of said remaining frames is being projected; and means responsive to said predetermined output condition for controlling said circuit means to condition the clutch to prevent the motor being decoupled from the sprocket means until said last projected correct answer frame is again projected.

9. A combination as defined in claim 8, further including fixed and movable transparent plates located on opposite sides of the film, through which the film image is projected; and means to move said movable plate to clamp the film between said plates whenever the film is stopped, and to separate the movable plate from the fixed plate during movement of the film.

10. In a self-tutoring device, the combination of: a housing having a panel supporting a viewing screen; a plurality of manually operable elements supported on said panel adjacent said screen; projector apparatus in said housing having a pair of reels for supporting a strip of film; an optical system for projecting the film images on said screen; a length of film carried by said reels having successive frames that contain items of information in non-logical sequence, but wherein items of information on non-successive frames are in logical sequence; drive means for moving said film strip in one direction or the other past the optical system; control means for said drive means; means operable by certain of said manually operable elements to establish operation of said drive means for moving said film in one direction to successive positions in which items of information in logcal sequence are projected on said screen; and means operable, in the event information on a frame projected on said screen is not in logical sequence to that on the immediately preceding frame, to cause said drive means to operate in a direction to cause said immediately preceding frame to be projected on said screen.

11. In a self-tutoring system, an indexing switch mechanism comprising:

wafer switch means having fixed circuit contact elements about an axis;

movable contact means to engage said fixed contact elements;

means supporting said movable contact means for angular movement about said axis, and for axial movement along said axis between one position, wherein the movable contact means engage said fixed contact elements, and another position, wherein the movable contact means are spaced and disengaged from said fixed contact elements;

clutch means for selectively axially moving said supporting means to one of said positions;

a solenoid; and armature means for said solenoid including said clutch means;

said supporting means including a disc element on which the movable contact means are mounted, a rotary member to which said disc is secured, and means normally biasing said clutch means into engagement with said rotary member; said clutch means including a plate of magnetic material, said plate being coaxial with said rotary member, said plate and said rotary member having interlockable means on their opposed faces, said plate also having peripheral teeth, a gear meshing with said plate, and means to drive said gear.

12. The combination defined in claim 11 further including control means for controlling operation of said gear drive means; and means to effect operation of said control means through operation of said rotary member.

13. In an instructor system, the combination of: a record strip comprising a series of frames for viewing; drive means for driving said record strip past a viewing station; code means on a first frame and viewable by the operator of the system when said first frame is at said viewing station, said code means indicating the relative positions of a proper frame and at least one improper frame; control means for controlling said drive means; and manually operable selector means for energizing said control means to advance said strip to position a selected frame for viewing; said control means including memory means for storing the relative positions of said first and selected frames; said selector means including a reverse position for repositioning said first frame for viewing.

14. In an instructor system, the combination of: a record strip comprising a series of frames for viewing; drive means for driving said record strip past a viewing station; first code means on a first frame indicating the relative positions of a proper frame and at least one improper frame; first control means for controlling said drive means; manually operable selector means for energizing said first control means to advance said strip to position a selected frame for viewing; said first control means including memory means for storing the relative positions of said first and selected frames; said selector means including a reverse position for repositioning said first frame for viewing; second code means on said frames for identifying proper and improper frames; and second control means for reading said second code means and blocking advance of said strip when an improper frame is positioned for viewing.

15. In an instructor system, the combination of: a record strip comprising a series of frames for viewing; drive means for driving said record strip past a viewing station; first code means on a first frame indicating the relative positions of a proper frame and at least one improper frame; first control means for controlling said drive means; manually operable selector means for energizing said first control means to advance said strip to position a selected frame for viewing; said first control means including memory means for storing the relative positions of said first and selected frames; said selector means including a reverse position for repositioning said first frame for viewing; second code means on said frames for identifying proper and improper frames; and second control means for reading said second code means to block advance of said strip when an improper frame is positioned for viewing and to reset said memory means to a clear condition when said selector means is actuated to advance said strip from a proper frame.

16. In an instructor system, the combination of: a record strip comprising a series of frames for viewing; drive means for driving said record strip past a viewing station; first code means on a first frame indicating the relative positions of a proper frame and at least one improper frame; first control means for controlling said drive means, said first control means including a commutator driven in synchronism with said strip drive means; manually operable selector means for energizing said first control means to advance said commutator from an initial setting to a selected setting and simultaneously advance said strip to position a selected frame for viewing, said selector means including a reverse position for returning said commutator to the initial setting and repositioning said first frame for viewing; and second control means for driving said commutator independently of said strip drive means to return said commutator to the initial setting when operation of said selector means initiates an advance of said strip.

17. In an instructor system, the combination of: a record strip comprising a series of frames for viewing; drive means for driving said record strip past a viewing station; first code means on a first frame indicating the relative positions of a proper frame and at least one improper frame; first control means for controlling said drive means, said first control means including a commutator driven in synchronism with said strip drive means; manually operable selector means for energizing said first control means to advance said commutator from an initial setting to a selected setting and simultaneously advance said strip to position a selected frame for viewing, said selector means including a reverse position for returning said commutator to the initial setting and repositioning said first frame for viewing; second code means on said frames for identifying proper and improper frames; second control means for reading said second code means and blocking advance of said strip when an improper frame is positioned for viewing; and third control means for driving said commutator independently of said strip drive means to return said commutator to the initial setting when operation of said selector means initiates an advance of said strip.

18. In an instructor system, the combination of: a record strip comprising a series of frames for viewing; drive means for driving said record strip past a viewing station; first code means on a first frame indicating the relative positions of a proper frame and at least one improper frame; first control means for controlling said drive means; manually operable selector means for energizing said first control means to advance said strip to position a selected frame for viewing; said first control means including memory means for storing the relative positions of said first and selected frames; said selector means including a reverse position for repositioning said first frame for viewing; second code means on said frames for identifying proper and improper frames, said second code means having different light-transmisison characteristics for proper and improper frames; a light-sensitive element disposed adjacent said viewing station and second code means, said element having a predetermined output condition when an improper frame is positioned for viewing; and second control means actuated by said predetermined output condition for blocking advance of said strip when an improper frame is positioned for viewing.

19. In an instructor system, the combination of:
a record strip comprising a series of frames for viewing;
drive means for driving said record strip past a viewing station;
code means on a first frame and viewable by the operator of the system when said first frame is at said viewing station, said code means indicating the relative positions of a proper frame and at least one improper frame;
control means for controlling said drive means; and
manually operable selector means for energizing said control means to advance said strip to position a selected frame for viewing;
said control means including memory means for storing the relative positions of said first and selected frames; and
means in said control means for shifting the condition of said memory means to substitute therein one of said selected frames for said first frame.

(References on following page)

References Cited in the file of this patent

UNITED STATES PATENTS

| | | |
|---|---|---|
| 704,447 | Eastwood | July 8, 1902 |
| 1,987,544 | Wood | Jan. 8, 1935 |
| 2,121,061 | Townsend | June 21, 1938 |
| 2,323,372 | Bryce | July 6, 1943 |
| 2,464,220 | Duncan | Mar. 15, 1949 |
| 2,464,561 | Dickinson | Mar. 15, 1949 |
| 2,482,242 | Brustman | Sept. 20, 1949 |
| 2,521,284 | Clough | Sept. 5, 1950 |
| 2,659,779 | Haley | Nov. 17, 1953 |
| 2,783,454 | North | Feb. 26, 1957 |
| 2,877,568 | Besnard | Mar. 17, 1959 |
| 2,923,921 | Shapin | Feb. 2, 1960 |

OTHER REFERENCES

RCA TN No. 51, Dec. 2, 1957.